L. A. LINES.
NUT LOCK.
APPLICATION FILED JUNE 27, 1914.
1,142,899.
Patented June 15, 1915.
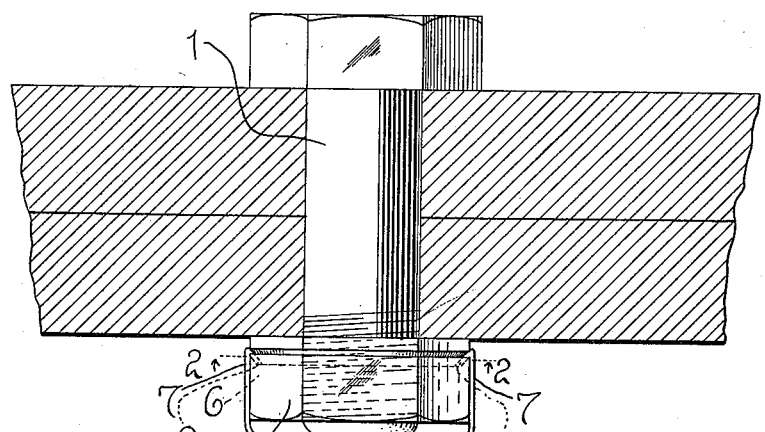
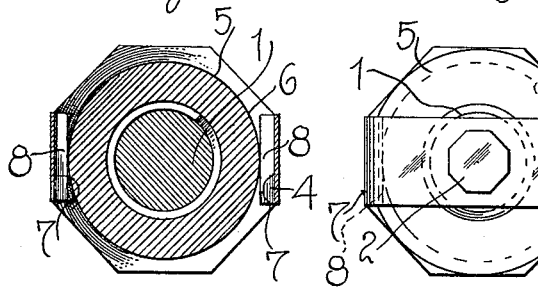
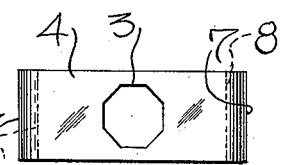
Inventor
LEWIS A. LINES
Witnesses
Robert M. Sutphen
A. J. Hind
By Watson E. Coleman
Attorney

UNITED STATES PATENT OFFICE.

LEWIS A. LINES, OF PERRY, NEW YORK.

NUT-LOCK.

1,142,899.   Specification of Letters Patent.   Patented June 15, 1915.

Application filed June 27, 1914. Serial No. 847,711.

*To all whom it may concern:*

Be it known that I, LEWIS A. LINES, a citizen of the United States, residing at Perry, in the county of Wyoming and State of New York, have invented certain new and useful Improvements in Nut-Locks, of which the following is a specification, reference being had to the accompanying drawings.

This invention relates to new and useful improvements in nut-locks, and an object of this invention is the provision of a simple and inexpensive nut-lock which will be efficient and durable in use to securely lock a nut upon a bolt against relative turning.

Another object of this invention is the provision of a nut-lock which will be applicable to nuts of various sizes, to lock the same upon bolts.

A still further object of this invention is the provision of a nut-lock which comprises a locking plate having an angular opening therein for engagement with an angular reduced extension upon a bolt, the plate having inwardly extending locking arms at its ends to engage the opposite side faces of the nut mounted upon the bolt, the ends of the locking arms being provided with inwardly and rearwardly directed flanges for engagement in recesses in the sides of the nut, whereby the nut is prevented from turning on the bolt.

With these and other objects in view, my invention consists in the novel construction, combination, and arrangement of parts, to be hereinafter more fully described, claimed, and illustrated in the accompanying drawing, in which—

Figure 1 is a top plan view of my improved device showing the same applied to use; Fig. 2 is a sectional view on the line 2—2 of Fig. 1; Fig. 3 is an end view of the device; and Fig. 4 is an elevational view of the locking plate.

Referring more particularly to the drawing, the numeral 1 designates a threaded bolt which is provided with a reduced angular extension 2 on its outer end to extend through the opening 3 in the spring metal locking plate 4. An angular nut 5 is screwed on the threaded portion of the bolt 1, the nut being provided in its side faces with an obliquely extending groove 6, the groove 6 opening on the faces of the nut and extending inwardly and rearwardly within the same. Formed on the opposite ends of the locking plate 4 are laterally extending arms 7, the arms being adapted to engage against opposite sides of the nut, and being provided at their extremities with inwardly and rearwardly projecting flanges 8, for engagement in the grooves 6 in the nut.

In the practical use of my improved device, the bolt is disposed through the objects to be secured together, and the nut is screwed on the threaded end of the bolt flush against the outermost object, whereupon the spring locking plate is disposed so that the reduced extension 2 of the bolt projects through the angular opening 3 of the locking plate, with the arms 7 spread and engaged against the opposite sides of the nut. The plate 4 is moved inwardly until the flanges 8 of the arms spring into the recess 6 of the nut, whereupon the plate is secured in locking position on the bolt and nut to prevent relative turning of the same.

From the above description taken in connection with the accompanying drawing, it will be seen that my improved locking plate is applicable to nuts of various thicknesses, and that the plate may be operatively engaged with the nut and bolt, when the bolt is disposed through objects of varying thicknesses. It will be seen that as the locking plate is moved inwardly so that the reduced extension 2 of the bolt will project through the opening 3 in the plate, the flanges 8 on the ends of the arms 7 will engage against the forward edge of the nut to spread the arms, so that the same will automatically spring inwardly to move the flanges into the groove and automatically lock the plate 4 to the nut and bolt, and prevent accidental disengagement of the locking plate from the nut and bolt.

Having thus fully described my invention, what I desire to claim and secure by Letters Patent is:—

In combination with a bolt having a reduced angular extension at its outer end, and a nut having an inwardly and rearwardly extending groove formed in its outer periphery adjacent its forward edge and at an acute angle to said outer periphery, of a spring metal locking plate having an angular central opening therein to receive the extension of the bolt therethrough, said plate having forwardly extending arms at its opposite ends for engagement against opposite faces of the nut, the extremities of said arms having inwardly and rearwardly extending acutely angled flanges formed thereon for engagement in the groove in the nut, and said arms being of a greater length than the thickness of the nut, whereby the arms may be forced forwardly of the nut to thereby cause the inner face of the groove to exert an outward wedging action on said angled flanges whereby to remove the flanges from engagement with said groove.

In testimony whereof I hereunto affix my signature in the presence of two witnesses.

LEWIS A. LINES.

Witnesses:
RUTH NICHOLS,
KATE PIDGEON.

Copies of this patent may be obtained for five cents each, by addressing the "Commissioner of Patents, Washington, D. C."